United States Patent
Huang et al.

(10) Patent No.: US 9,432,672 B2
(45) Date of Patent: Aug. 30, 2016

(54) IMAGE COMPRESSION METHOD AND SYSTEM WITH IMAGE COMPRESSION TIME INFORMATION

(71) Applicant: Tencent Technology (Shenzhen) Company Limited, Shenzhen (CN)

(72) Inventors: Feiyue Huang, Shenzhen (CN); Yongjian Wu, Shenzhen (CN); Feng Gao, Shenzhen (CN); Shouhong Ding, Shenzhen (CN); Qingliang Lin, Shenzhen (CN); Lu Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/682,951

(22) Filed: Apr. 9, 2015

(65) Prior Publication Data
US 2015/0215625 A1 Jul. 30, 2015

Related U.S. Application Data

(63) Continuation of application No. PCT/CN2013/000889, filed on Jul. 25, 2013.

(30) Foreign Application Priority Data

Oct. 11, 2012 (CN) .......................... 2012 1 0384676

(51) Int. Cl.
- G06K 9/00 (2006.01)
- H04N 19/136 (2014.01)
- H04L 29/08 (2006.01)

(52) U.S. Cl.
CPC ............ *H04N 19/136* (2014.11); *H04L 67/02* (2013.01); *H04L 67/1004* (2013.01); *H04L 67/1008* (2013.01); *H04L 67/1034* (2013.01); *H04L 67/2828* (2013.01)

(58) Field of Classification Search
CPC .......... H04L 67/1008; H04L 67/2828; H04L 67/1034; H04L 67/02; H04L 67/1004; H04N 19/136
USPC ...................................... 382/239, 232, 250
See application file for complete search history.

(56) References Cited

U.S. PATENT DOCUMENTS

| 8,107,755 | B2 * | 1/2012 | Hosaka | H04N 19/63 348/398.1 |
| 8,301,645 | B1 * | 10/2012 | Crook | G06F 17/30067 707/755 |

(Continued)

FOREIGN PATENT DOCUMENTS

| CN | 101741850 A |   | 6/2010 |
| CN | 102104617 A | * | 6/2011 |

(Continued)

OTHER PUBLICATIONS

Tencent Technology, ISRWO, PCT/CN2013/000889, Nov. 7, 2013, 7 pgs.
Tencent Technology, IPRP, PCT/CN2013/000889, Apr. 14, 2015, 4 pgs.

*Primary Examiner* — Mekonen Bekele
(74) *Attorney, Agent, or Firm* — Morgan, Lewis & Bockius LLP (57) ABSTRACT

The present disclosure provides an image compression method and system. The method includes: receiving, by an access server, an image compression request submitted by a terminal; selecting, by the access server according to the image compression request's time information, an image compression server whose load is lower than a preset threshold, and sending the image compression request to the selected image compression server; compressing, by the selected image compression server, the images according to the image compression request, saving the compressed images, and forwarding URL addresses of the compressed images to the access server; and forwarding, by the access server, the URL addresses to the terminal. In the present disclosure, an image compression system processes an image compression request of a terminal, and performs load balancing automatically according to the load of various image compression servers in the system, thereby implementing automatic processing of mass images of the terminal.

13 Claims, 5 Drawing Sheets

(56) References Cited

U.S. PATENT DOCUMENTS

| | | | |
|---|---|---|---|
| 2003/0118240 A1* | 6/2003 | Satoh | H04N 19/176 382/239 |
| 2005/0018907 A1* | 1/2005 | Kawanishi | H04N 19/59 382/232 |
| 2005/0180643 A1* | 8/2005 | Okada | H04N 19/127 382/232 |
| 2007/0143116 A1 | 6/2007 | De Armas et al. | |

FOREIGN PATENT DOCUMENTS

| | | | |
|---|---|---|---|
| CN | 102523158 A | 6/2012 | |
| EP | 1094645 A2 | 4/2001 | |
| JP | 2004343607 A * | 12/2004 | H04N 7/26244 |

* cited by examiner

IMAGE COMPRESSION METHOD AND SYSTEM WITH IMAGE COMPRESSION TIME INFORMATION

RELATED APPLICATIONS

This application is a continuation application of PCT Patent Application No. PCT/CN2013/000889, entitled "IMAGE COMPRESSION METHOD AND SYSTEM" filed on Jul. 25, 2013, which claims priority to Chinese Patent Application No. 201210384676.6, "IMAGE COMPRESSION METHOD AND SYSTEM," filed on Oct. 11, 2012, both of which are hereby incorporated by reference in their entirety.

TECHNICAL FIELD

The present disclosure relates to the field of computer technologies, and in particular, to an image compression method and system.

BACKGROUND OF THE DISCLOSURE

Along with the development of image capturing devices, images shot or created by the devices have increasingly higher quality and capacity. Moreover, as the number of images increases, increasingly more space is occupied by image data, and accordingly, an image compression technology emerges. Currently, a commonly used compression method is to reorganize and encode image data by using technical means, so as to obtain an image occupying less file space.

In the existing technology, a user can perform compression processing on images by using an image processing application in a terminal; and a professional developer can perform compression processing on images by calling an application programming interface (API) function provided by a third-party code library and calling a development kit provided by the third-party code library.

During implementation of the present application, the inventor finds that the existing technology has at least the following problems:

When a user performs image compression processing by using an image processing application, the user can only perform a compression operation on each image manually but cannot process the images in batches, and the efficiency is low; when a development kit provided by a third-party code library is used to perform compression processing on images, because the compression process is a compute-intensive operation, the user needs to deploy a load balancing process by himself/herself when there are mass images, which affects user experience.

SUMMARY

The present disclosure takes into consideration the problems in the existing technology that a user terminal cannot compress images in batches and a professional need to deploy load balancing by himself/herself when compressing images by using a development kit provided by a third-party code library, and provides an image compression method and system through multiple embodiments.

In one aspect, an image compression method is provided, which includes:

receiving, by an access server, an image compression request submitted by a terminal, the image compression request including multiple to-be-compressed images or uniform resource locator (URL) addresses corresponding to the to-be-compressed images, and image compression time information corresponding to each of the to-be-compressed images;

selecting, by the access server according to the image compression time information, a size of the to-be-compressed images and a target compression ratio, an image compression server whose load is lower than a preset threshold, and sending the image compression request to the selected image compression server, so that the selected image compression server can compress the images according to the image compression request and save the compressed images;

receiving, by the access server, URL addresses of the compressed images from the selected image compression server; and forwarding, by the access server, the URL addresses of the compressed images to the terminal.

The step of selecting, by the access server according to the image compression time information, an image compression server whose load is lower than a preset threshold, and sending the image compression request to the selected image compression server may include:

selecting, by the access server according to real-time image compression time information, an image compression server whose current load is lower than the preset threshold, and sending the image compression request to the selected image compression server; or, dividing, by the access server according to delayed image compression time information, a period of time from a current time point to the delayed image compression time information into equal image compression intervals, selecting, in each of the image compression intervals, an image compression server whose load is lower than the preset threshold, and sending the image compression request to the selected image compression server.

The step of compressing, by the selected image compression server, the images according to the image compression request and saving the compressed images may include:

compressing, by the selected image compression server, the images according to the to-be-compressed images carried in the image compression request; or, acquiring, by the selected image compression server, the to-be-compressed images according to the URL addresses of the images carried in the image compression request, and compressing the images.

After the step of receiving, by an access server, an image compression request submitted by a terminal, the method may further include:

sending, by the access server, the to-be-compressed images to a fault-tolerant backup server for backup; or, acquiring, by the access server, the to-be-compressed images according to the URL addresses, and sending the to-be-compressed images to a fault-tolerant backup server for backup.

The method may further include:

sending, by a compression algorithm control server, a compression algorithm and/or kernel data updating command to the image compression server, so that the image compression server adjusts its own image compression manner according to the updated compression algorithm and/or kernel data.

After forwarding, by the access server, the URL addresses of the compressed images to the terminal, the method may further include:

detecting an image download request from the terminal;

extracting at least one of the URL addresses of the compressed images from the image download request;

returning the corresponding compressed images to terminal; and deleting the corresponding compressed images after receiving from the terminal an acknowledgement of receiving the corresponding compressed images.

In another aspect, an image compression system is provided, which includes an access server having one or more processors, memory and one or more program modules stored in the memory and to be executed by the one or more processors, the one or more program modules further including: a receiving module, a processing module, and a sending module;

the receiving module being configured to receive an image compression request submitted by a terminal, the image compression request including multiple to-be-compressed images or URL addresses corresponding to the to-be-compressed images, and image compression time information corresponding to each of the to-be-compressed images;

the processing module being configured to select, according to the image compression time information, a size of the to-be-compressed images and a target compression ratio, an image compression server whose load is lower than a preset threshold, and send the image compression request to the selected image compression server, so that the selected image compression server can compress the images according to the image compression request and save the compressed images; and the sending module being configured to receive URL addresses of the compressed images, and forward the URL addresses of the compressed images to the terminal.

The processing module includes at least one of a first processing unit and a second processing unit, where the first processing unit is configured for the access server to select, according to real-time image compression time information, an image compression server whose current load is lower than the preset threshold, and send the image compression request to the selected image compression server; and the second processing unit is configured for the access server to divide, according to delayed image compression time information, a period of time from a current time point to the delayed image compression time information into equal image compression intervals, select, in each of the image compression intervals, an image compression server whose load is lower than the preset threshold, and send the image compression request to the selected image compression server.

The image compression server may further include a compression module, the compression module including at least one of a first compression unit and a second compression unit, where the first compression unit is configured to compress the images according to the to-be-compressed images carried in the image compression request, save the compressed images, and return URL addresses of the compressed images to the access server; and the second compression unit is configured to acquire the to-be-compressed images according to the URL addresses of the images carried in the image compression request, compress the images, save the compressed images, and return URL addresses of the compressed images to the access server.

The access server may further include at least one of a first backup module and a second backup module, where the first backup module is configured to send the to-be-compressed images to a fault-tolerant backup server for backup; and the second backup module is configured to acquire the to-be-compressed images according to the URL addresses, and send the to-be-compressed images to a fault-tolerant backup server for backup.

The system may further include a compression algorithm control server, where the compression algorithm control server is configured to send a compression algorithm and/or kernel data updating command to the image compression server, so that the image compression server adjusts its own image compression manner according to the updated compression algorithm and/or kernel data.

The technical solutions provided by the embodiments of the present application has the following beneficial effects:

An image compression system processes an image compression request of a terminal, and performs load balancing automatically according to the load of various image compression servers in the system, thereby implementing processing of mass images of the terminal while achieving the objective of automatic adjustment of load balancing.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DESCRIPTION OF EMBODIMENTS

In order make the objectives, technical solutions and advantages of the present application more comprehensible, the embodiments of the present application are described in further detail with reference to the accompanying drawings.

Embodiment 1

Figure 1:
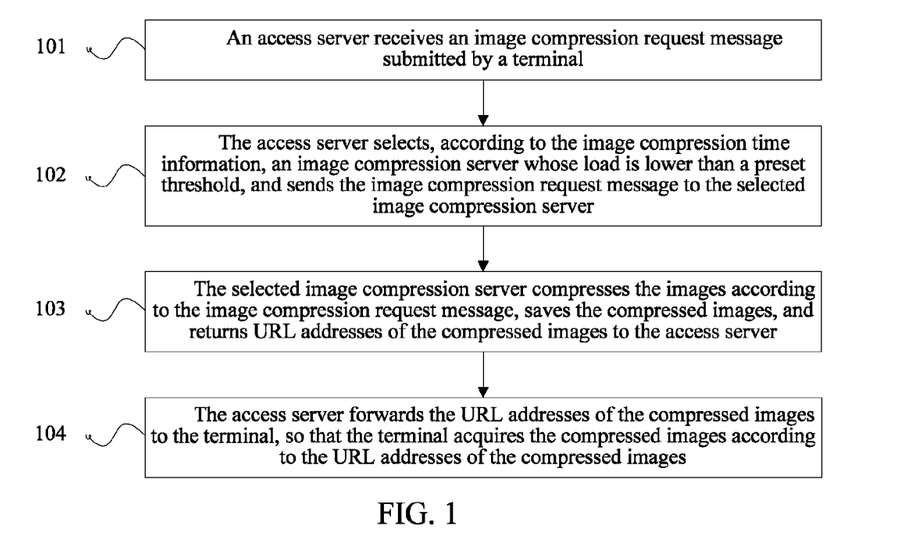
FIG. 1 is a flowchart of an image compression method according to Embodiment 1 of the present application.

An embodiment of the present application provides an image compression method, as shown in FIG. 1. The process of the method at least includes steps 101, 102 and 104 that are performed by an access server.

Step 101: An access server receives an image compression request submitted by a terminal, where the image compression request includes multiple to-be-compressed images or URL addresses corresponding to the to-be-compressed images, and image compression time information corresponding to each of the to-be-compressed images. The image compression request may further optionally include compression related parameter information selected by a user at a website, such as, a size of the to-be-compressed images, a target image compression ratio, lossy or lossless processing manner, and information about image resolution adjustment. In some embodiments, the user of the terminal specifies his/her preference for the compressed image by prioritizing the different compression related parameters. For example, the user may assign a higher priority to the image compression time information if he/she wants to receive the compressed images as quickly as possible or within a predefined time period. Alternatively, if the user cares more about the compression quality, he/she may assign a higher priority to the target image compression ratio even if this means that he/she may not receive the compressed images within the predefined time period dictated by the image compression time information.

Step 102: The access server selects, according to the image compression time information, the size of the to-be-compressed images and the target compression ratio, an image compression server whose load is lower than a preset threshold, and sends the image compression request to the selected image compression server, so that the selected image compression server can perform processing in step 103.

Step 103: The selected image compression server compresses the images according to the image compression request, saves the compressed images, and returns URL addresses of the compressed images to the access server.

Step 104: The access server receives the URL addresses of the compressed images from the selected image compression server, and forwards the URL addresses of the compressed images to the terminal. This step enables the terminal to acquire the compressed images according to the URL addresses of the compressed images.

In some embodiments, after forwarding the URL addresses of the compressed images to the terminal, the access server detects an image download request from the terminal, which may be triggered by a user selection of at least one of the URL addresses on the terminal. In response, the access server extracts the user-selected one of the URL addresses of the compressed images from the image download request, identifies the corresponding compressed images associated with the URL address, and returns the identified compressed images to the terminal. In some embodiments, the access server then receives from the terminal an acknowledgement of receiving the corresponding compressed images. After that, the access server deletes the corresponding compressed images.

In this embodiment of the present application, an image compression system processes an image compression request of a terminal, and performs load balancing automatically according to the load of various image compression servers in the system, thereby implementing processing of mass images of the terminal while achieving the objective of automatic adjustment of load balancing.

Embodiment 2

Figure 2:
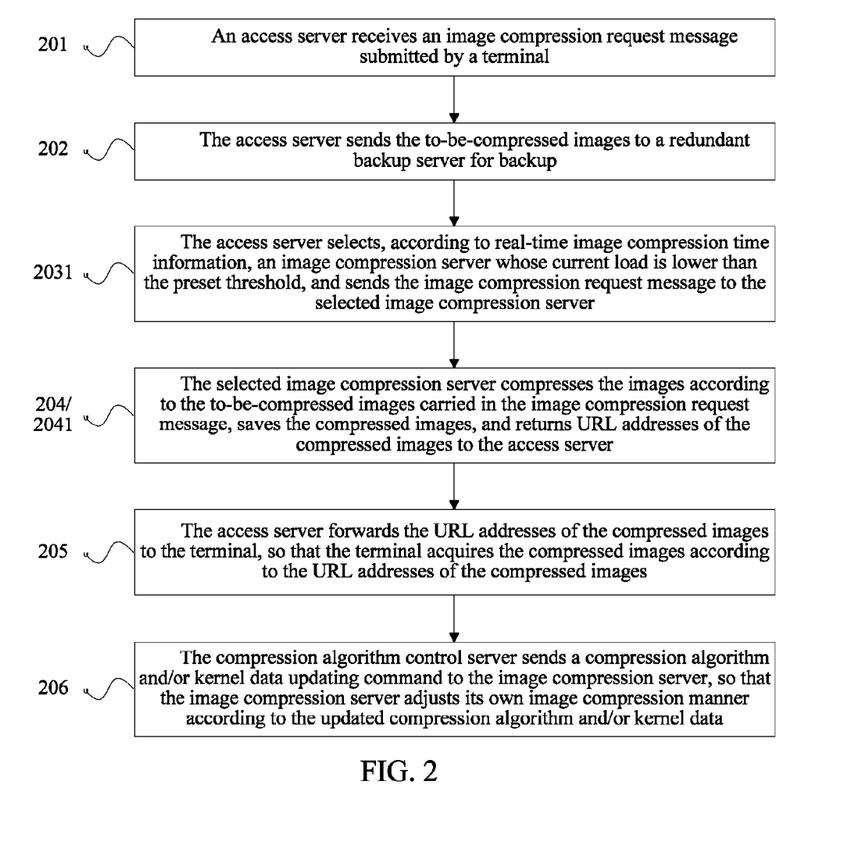
FIG. 2 is a flowchart of an image compression method according to Embodiment 2 of the present application.

An embodiment of the present application provides an image compression method, as shown in FIG. 2. It should be noted that in this embodiment of the present application, real-time compression processing is performed on images, and the images are returned to a terminal after the real-time compression processing. Further, a server involved in this embodiment of the present application may be a single server, or may also be a server cluster, which is not limited herein.

The process of the method at least includes steps 201, 203 and 205 that are performed by an access server, and may further include optional steps 202 and 206.

Step 201: An access server receives an image compression request submitted by a terminal, where the image compression request includes multiple to-be-compressed images or URL addresses corresponding to the to-be-compressed images, and image compression time information corresponding to each of the to-be-compressed images. In some embodiments, the image compression request includes a size of the to-be-compressed images and a target compression ratio.

Specifically, after a terminal chooses to perform image compression processing in real time, the sent image compression request includes one or more to-be-compressed images or URL addresses corresponding to the to-be-compressed images uploaded by the terminal, and at the same time, the image compression request further includes image compression time information corresponding to each of the to-be-compressed images. Correspondingly, in this embodiment of the present application, the image compression time information is real-time image compression time information. Further, the image compression request may further optionally include compression related parameter information selected by the user at a website, such as a size of the to-be-compressed images, a target image compression ratio, lossy or lossless processing manner, and information about image resolution adjustment.

Preferably, in this embodiment of the present application, to-be-compressed images uploaded by the user are received in the process of requesting real-time image compression.

Optional step 202: The access server sends the to-be-compressed images to a fault-tolerant backup server for backup; or acquires the to-be-compressed images according to the URL addresses of the to-be-compressed images and sends the to-be-compressed images to a fault-tolerant backup server for backup.

Preferably, the access server may back up in advance the to-be-compressed images carried in the image compression request submitted by the terminal, and send the to-be-compressed images to the fault-tolerant backup server before compression. This prevents the failure of the image compression service due to loss of original images that is caused by an error occurring during the compression process of the image compression server.

When the image compression server fails in implementing the image compression process, the image compression server sends, to the access server, a request for acquiring backup images; the access server sends, according to the request message, a request for searching for the backup images to the fault-tolerant backup server; after finding the backup images, the fault-tolerant backup server returns the backup images to the access server; and the access server further returns the images to the image compression server for recompression.

Step 203: The access server selects, according to the image compression time information, the size of the to-be-compressed images and the target compression ratio, an image compression server whose load is lower than a preset threshold, and sends the image compression request to the selected image compression server, so that the selected image compression server can perform processing in step 204.

Specifically, after the terminal chooses to perform the image compression service in real time, the time information in the image compression request is real-time image compression time information, and therefore, the access server needs to respond to the request in real time to compress the images.

The image compression service is a compute-intensive operation, and the computing capability of a server is used to process the function of image compression; therefore, for purpose of load balancing, the access server first checks the load situation of each image compression server in a current image compression server cluster, so as to obtain the load of each image compression server, and then, an image compression server whose load is lower than a preset threshold, that is, an image compression server having a low load, is selected as a target image compression server to which an image compression request of the terminal is allocated. Then, the received image compression request is sent to the target image compression server by using a message for distributing compression tasks.

Therefore, in this embodiment of the present application, step 203 is specifically:

Step 2031: The access server selects, according to the real-time image compression time information, an image compression server whose current load is lower than the preset threshold, and sends the image compression request to the selected image compression server.

Step 204: The selected image compression server compresses the images according to the image compression request, saves the compressed images, and returns URL addresses of the compressed images to the access server.

After the image carried in the image compression request is compressed according to a compression mode selected by the user, the compressed image is sent to an image storage server, and the image storage server saves the compressed image and returns, to the image compression server, a URL address at which the image is saved. The image compression server returns a result of the image compression and the URL address saved after the image compression to the access server.

Therefore, in this embodiment of the present application, step 204 is specifically:

Step 2041: The selected image compression server compresses the images according to the to-be-compressed images carried in the image compression request, saves the compressed images, and returns URL addresses of the compressed images to the access server.

Step 205: The access server receives the URL addresses of the compressed images from the selected image compression server, and forwards the URL addresses of the compressed images to the terminal. This step enables the terminal to acquire the compressed images according to the URL addresses of the compressed images.

Optional step 206: The compression algorithm control server sends a compression algorithm and/or kernel data updating command to the image compression server, so that the image compression server adjusts its own image compression manner according to the updated compression algorithm and/or kernel data.

Preferably, in the whole system, a compression algorithm control server may further be additionally deployed in the whole system. The compression algorithm control server performs two-way data interaction with the image compression computing server. The compression algorithm control server may control, by transmitting an updated parameter, such as an updated compression algorithm and/or kernel data, the image compression server to perform a corresponding operation.

In this embodiment of the present application, an image compression system processes an image compression request of a terminal, and performs load balancing automatically according to the load of various image compression servers in the system, thereby implementing processing of mass images of the terminal while achieving the objective of automatic adjustment of load balancing.

Embodiment 3

Figure 3:
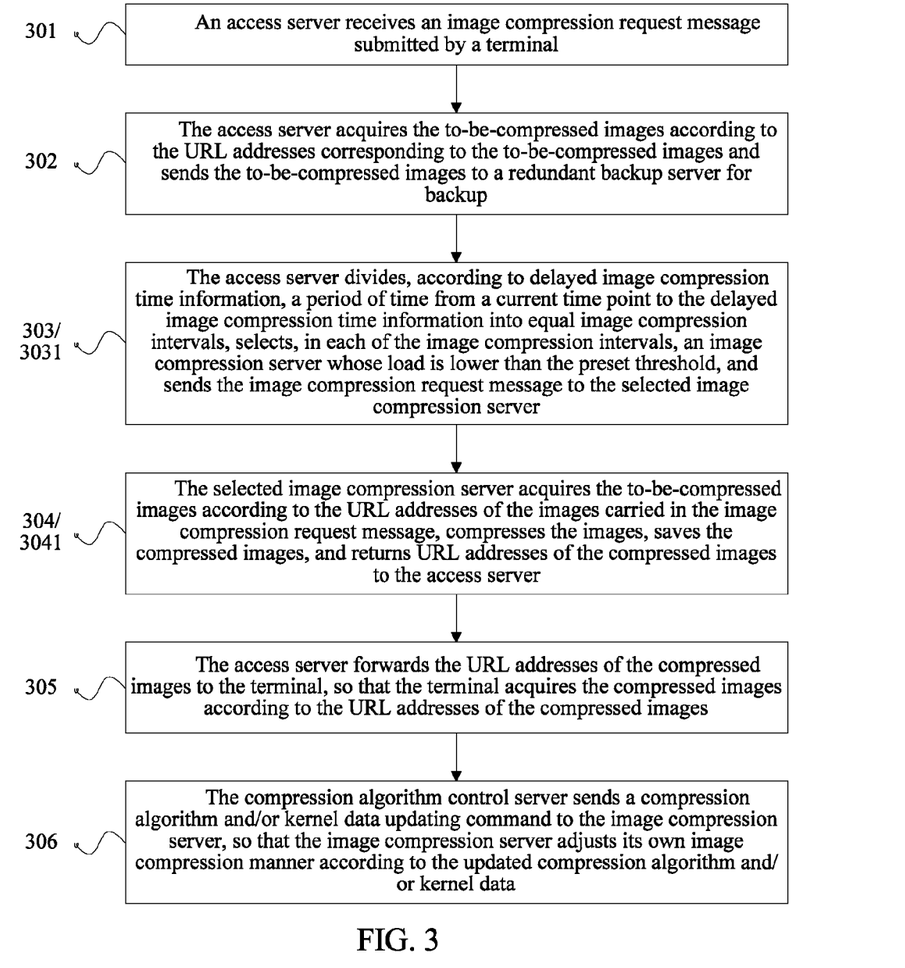
FIG. 3 is a flowchart of an image compression method according to Embodiment 3 of the present application.

An embodiment of the present application provides an image compression method, as shown in FIG. 3. It should be noted that in this embodiment of the present application, delayed compression processing is performed on images, and the images are returned to a terminal after the delayed compression processing. Further, a server involved in this embodiment of the present application may be a single server, or may also be a server cluster, which is not limited herein.

The process of the method at least includes steps 301, 303 and 305 that are performed by an access server, and may further include optional steps 302 and 306.

Step 301: An access server receives an image compression request submitted by a terminal, where the image compression request includes multiple to-be-compressed images or URL addresses corresponding to the to-be-compressed images, and image compression time information corresponding to each of the to-be-compressed images.

Specifically, the functions of the access server in this embodiment of the present application may be managed and implemented by using two different servers, and correspondingly, the two servers are: an offline compression service control server and an offline compression scheduling server.

The offline compression service control server in the access server is responsible for managing a registration service after a terminal selects delayed image compression. First, after the terminal selects a service for performing delayed image compression, the sent image compression request includes multiple to-be-compressed images or URL addresses corresponding to the to-be-compressed images uploaded by the terminal, and at the same time, the image compression request further includes image compression time information corresponding to each of the to-be-compressed images. Correspondingly, in this embodiment of the present application, the image compression time information is delayed image compression time information, that is, currently, the images are not compressed in real time. Further, the image compression request further includes compression related parameter information selected by the user at a website, such as a target image compression ratio, lossy or lossless processing manner, and information about image resolution adjustment.

The image compression request is sent to the offline compression service control server, and registration is performed in the server according to an agreed format protocol, so as to register the URL addresses of the to-be-processed images, a temporal frequency of processing, that is, delayed image processing time information, and related compression parameters.

The delayed image processing time information selected by the user may be, for example, one day, one week, or the like, and the user receives the compressed images when the time expires. Therefore, the image compression system does not need to perform compression processing on the images in real time, and can make full use of the period of time from the current time point to the expiration time to properly allocate time and image compression servers for processing, so that the amount of computation required for centralized compression of images of the user is distributed to multiple time periods to complete the compression task, thereby greatly reducing dependence on the amount of computation.

Optional step 302: The access server sends the to-be-compressed images to a fault-tolerant backup server for backup; or acquires the to-be-compressed images according to the URL addresses of the to-be-compressed images and sends the to-be-compressed images to a fault-tolerant backup server for backup.

Preferably, the offline compression scheduling server in the access server may back up in advance the to-be-compressed images or the images corresponding to the URL addresses of the to-be-compressed images that are carried in the image compression request submitted by the terminal; or may send the URL addresses of the to-be-compressed images to a fault-tolerant backup server before compression, and the fault-tolerant backup server acquires the images according to the URL addresses and saves the images for backup. This prevents the failure of the image compression service due to loss of original images that is caused by an error occurring during the compression process of the image compression server.

When the image compression server fails in implementing the image compression process, the image compression server sends, to the offline compression scheduling server in the access server, a request for acquiring backup images; the offline compression scheduling server in the access server sends, according to the request message, a request for searching for the backup images to the fault-tolerant backup server; after finding the backup images, the fault-tolerant backup server returns the backup images to the offline compression scheduling server in the access server; and the offline compression scheduling server in the access server further returns the images to the image compression server for recompression.

Step 303: The access server selects, according to the image compression time information, the size of the to-be-compressed images and the target compression ratio, an image compression server whose load is lower than a preset threshold, and sends the image compression request to the selected image compression server, so that the selected image compression server can perform processing in step 304.

Specifically, the offline compression scheduling server in the access server is responsible for balancing overall scheduling tasks. After receiving the image compression request submitted by the terminal and completing the registration process, the offline compression service control server sends the image compression request to the offline compression scheduling server, and the offline compression scheduling server schedules the compression tasks according to queuing tasks and delayed image compression time information in the image compression request of the current task.

In this case, the offline compression scheduling server in the access server divides a period of time from a current time point to the delayed image compression time information into equal image compression intervals according to the delayed image compression time information in the image compression request of the current task. The load situation of each image compression server in the current image compression server cluster is checked in each of the image compression intervals, so as to obtain the load of each image compression server, and then, an image compression server whose load is lower than a preset threshold, that is, an image compression server having a low load, is selected as a target image compression server to which the image compression request of the terminal is allocated. Then, the received image compression request is sent to the target image compression server by using a message for distributing compression tasks. Once all images corresponding to the image compression request are compressed, the task corresponding to the image compression request is finished.

Therefore, in this embodiment of the present application, step 303 is specifically:

Step 3031: The access server divides, according to the delayed image compression time information, a period of time from a current time point to the delayed image compression time information into equal image compression intervals, selects, in each of the image compression intervals, an image compression server whose load is lower than the preset threshold, and sends the image compression request to the selected image compression server.

Step 304: The selected image compression server compresses the images according to the image compression request, saves the compressed images, and returns URL addresses of the compressed images to the access server.

After receiving an image compression request corresponding to a distributed compression task, the image compression server first acquires an image according to a URL address in the image compression request, and then compresses the image.

After the image carried in the image compression request is compressed according to a compression mode selected by the user, the compressed image is sent to an image storage server, and the image storage server saves the compressed image and returns, to the image compression server, a URL address at which the image is saved. The image compression server returns a result of the image compression and the URL address saved after the image compression to the access server.

Therefore, in this embodiment of the present application, step 304 is specifically:

Step 3041: The selected image compression server acquires the to-be-compressed images according to the URL addresses of the images carried in the image compression request, compresses the images, saves the compressed images, and returns URL addresses of the compressed images to the access server.

Specifically, the URL addresses of the compressed images are returned to the offline compression scheduling server in the access server.

Step 305: The access server receives the URL addresses of the compressed images from the selected image compression server, and forwards the URL addresses of the compressed images to the terminal. This step enables the terminal to acquire the compressed images according to the URL addresses of the compressed images.

The offline compression scheduling server in the access server returns the URL addresses of the compressed images to the terminal according to an interface agreed with the terminal.

Optional step 306: The compression algorithm control server sends a compression algorithm and/or kernel data updating command to the image compression server, so that the image compression server adjusts its own image compression manner according to the updated compression algorithm and/or kernel data.

Preferably, a compression algorithm control server may further be additionally deployed in the whole system. The compression algorithm control server performs two-way data interaction with the image compression computation server. The compression algorithm control server may control, by transmitting an updated parameter, such as an updated compression algorithm and/or kernel data, the image compression server to perform a corresponding operation.

In this embodiment of the present application, an image compression system processes an image compression request of a terminal, and performs load balancing automatically according to the load of various image compression servers in the system, thereby implementing processing of mass images of the terminal while achieving the objective of automatic adjustment of load balancing.

Embodiment 4

Figure 4:
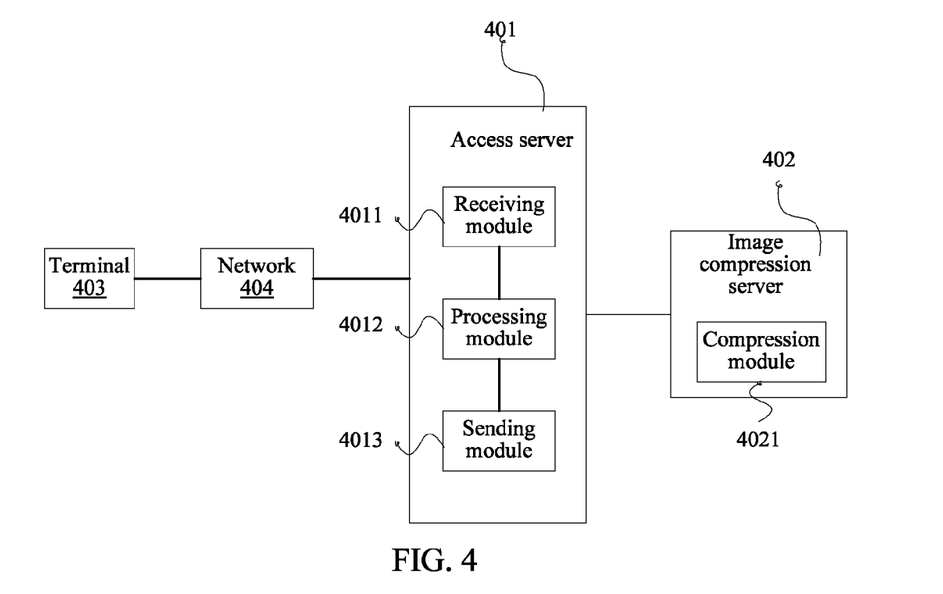
FIG. 4 is a schematic structural diagram of an image compression system according to Embodiment 4 of the present application.

An embodiment of the present application provides an image compression system, as shown in FIG. 4.

The system includes an access server 401, and the access server 401 is connected to an image compression server 402. One or more terminals 403 are connected to the access server 401 via a network 404 (e.g., the Internet). A user of the terminal 403 may send an image compression request to the access server 401 so as to compress one or more images identified in the request. For example, the user may have a user account at the access server for uploading and sharing images with others through the Internet. At some point, the user may want to download some of the pictures from the access server. Instead of performing the download operation once for each picture, the user may specify a set of parameters for a set of pictures to be downloaded to the terminal. In order to make the download of multiple pictures more efficiently, the terminal then generates an image compression request based on the set of parameters. In some embodiments, the image compression request specifies not only which picture(s) need to be compressed, but also when (e.g., using the image compression time information) and how (e.g., using the target compression ratio). Upon receipt of the image compression request, the access server 401 performs necessary operations accordingly and returns one or more URL addresses pointing to the user-desired compressed images to the terminal so that the user can download a large number of compressed images through a user selection of the one of the URL addresses.

In some embodiments, the access server 401 has one or more processors, memory and one or more program modules stored in the memory and to be executed by the one or more processors. For example, the one or more program modules further includes: a receiving module 4011, a processing module 4012, and a sending module 4013.

The receiving module 4011 is configured to receive an image compression request submitted by a terminal, where the image compression request includes multiple to-be-compressed images or URL addresses corresponding to the to-be-compressed images, and image compression time information corresponding to each of the to-be-compressed images.

The processing module 4012 is configured to select, according to the image compression time information, the size of the to-be-compressed images and the target compression ratio, an image compression server whose load is lower than a preset threshold, and send the image compression request to the selected image compression server, so that the selected image compression server compresses the images according to the image compression request and saves the compressed images.

The sending module 4013 is configured to receive URL addresses of the compressed images, and forward the URL addresses of the compressed images to the terminal, so that the terminal can acquire the compressed images according to the URL addresses of the compressed images.

The image compression server 402 includes a compression module 4021, where the compression module 4021 is configured to compress the images according to the image compression request, save the compressed images, and return URL addresses of the compressed images to the access server.

In this embodiment of the present application, an image compression system processes an image compression request of a terminal, and performs load balancing automatically according to the load of various image compression servers in the system, thereby implementing processing of mass images of the terminal while achieving the objective of automatic adjustment of load balancing.

Embodiment 5

Figure 5:
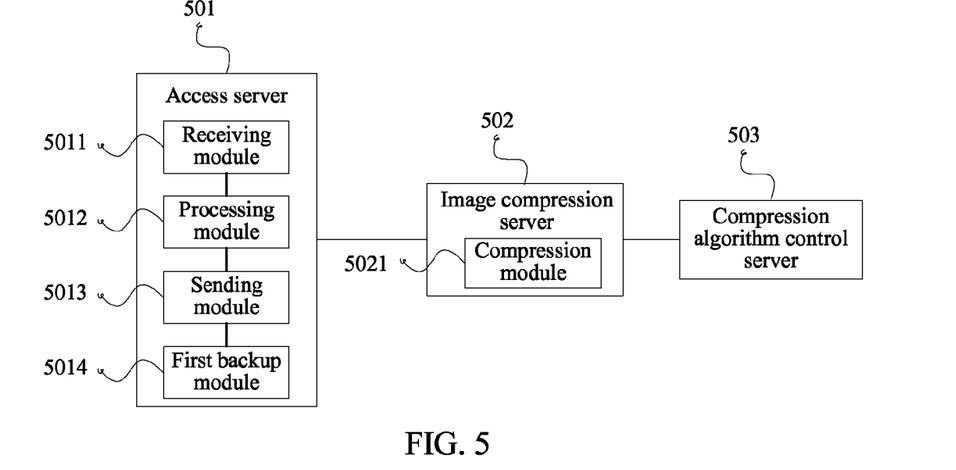
FIG. 5 is a schematic structural diagram of an image compression system according to Embodiment 5 of the present application.

An embodiment of the present application provides an image compression system, as shown in FIG. 5.

The system includes an access server 501, and the access server 501 is connected to an image compression server 502.

The access server 501 includes: a receiving module 5011, a processing module 5012, and a sending module 5013.

The receiving module 5011 is configured to receive an image compression request submitted by a terminal, where the image compression request includes multiple to-be-compressed images or URL addresses corresponding to the to-be-compressed images, and image compression time information corresponding to each of the to-be-compressed images.

The processing module 5012 is configured to select, according to the image compression time information, the size of the to-be-compressed images and the target compression ratio, an image compression server whose load is lower than a preset threshold, and send the image compression request to the selected image compression server, so that the selected image compression server compresses the images according to the image compression request and saves the compressed images.

The sending module 5013 is configured to receive URL addresses of the compressed images, and forward the URL addresses of the compressed images to the terminal, so that the terminal can acquire the compressed images according to the URL addresses of the compressed images.

The processing module 5012 includes:

a first processing unit (not shown), configured for the access server to select, according to real-time image compression time information, an image compression server whose load is lower than the preset threshold, and send the image compression request to the selected image compression server.

The access server 501 further optionally includes:

a first backup module 5014, configured to send the to-be-compressed images to a fault-tolerant backup server for backup.

The image compression server 502 includes a compression module 5021.

The compression module 5021 is configured to compress the images according to the image compression request, save the compressed images, and return URL addresses of the compressed images to the access server.

The compression module 5021 includes:

a first compression unit (not shown), configured to compress the images according to the to-be-compressed images carried in the image compression request, save the compressed images, and return URL addresses of the compressed images to the access server.

The system may further optionally include a compression algorithm control server 503, where the compression algorithm control server 503 is configured to send a compression algorithm and/or kernel data updating command to the image compression server, so that the image compression server adjusts its own image compression manner according to the updated compression algorithm and/or kernel data.

In this embodiment of the present application, an image compression system processes an image compression request of a terminal, and performs load balancing automatically according to the load of various image compression servers in the system, thereby implementing processing of mass images of the terminal while achieving the objective of automatic adjustment of load balancing.

Embodiment 6

Figure 6:
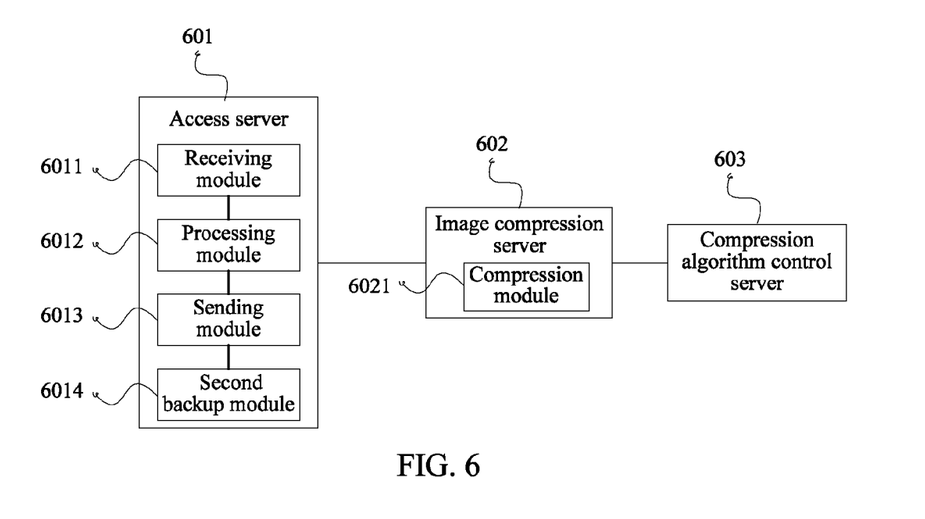
FIG. 6 is a schematic structural diagram of an image compression system according to Embodiment 6 of the present application.

An embodiment of the present application provides an image compression system, as shown in FIG. 6.

The system includes an access server 601, and the access server is connected to an image compression server 602.

The access server 601 includes: a receiving module 6011, a processing module 6012, and a sending module 6013.

The receiving module 6011 is configured to receive an image compression request submitted by a terminal, where the image compression request includes multiple to-be-compressed images or URL addresses corresponding to the to-be-compressed images, and image compression time information corresponding to each of the to-be-compressed images.

The processing module 6012 is configured to select, according to the image compression time information, the size of the to-be-compressed images and the target compression ratio, an image compression server whose load is lower than a preset threshold, and send the image compression request to the selected image compression server, so that the selected image compression server compresses the images according to the image compression request and saves the compressed images.

The sending module 6013 is configured to receive URL addresses of the compressed images, and forward the URL addresses of the compressed images to the terminal, so that the terminal can acquire the compressed images according to the URL addresses of the compressed images.

The processing module 6012 includes:

a second processing unit (not shown), configured for the access server to divide, according to delayed image compression time information, a period of time from a current time point to the delayed image compression time information into equal image compression intervals, select, in each of the image compression intervals, an image compression server whose load is lower than the preset threshold, and send the image compression request to the selected image compression server.

The access server 601 further optionally includes:

a second backup module 6014, configured to acquire the to-be-compressed images according to the URL addresses, and send the to-be-compressed images to a fault-tolerant backup server for backup.

The image compression server 602 includes a compression module 6021.

The compression module 6021 is configured to compress the images according to the image compression request, save the compressed images, and return URL addresses of the compressed images to the access server.

The compression module 6021 includes:

a second compression unit (not shown), configured to acquire the to-be-compressed images according to the URL addresses of the images carried in the image compression request, compress the images, save the compressed images, and return URL addresses of the compressed images to the access server.

The system may further optionally include a compression algorithm control server 603.

The compression algorithm control server 603 is configured to send a compression algorithm and/or kernel data updating command to the image compression server, so that the image compression server adjusts its own image compression manner according to the updated compression algorithm and/or kernel data.

In this embodiment of the present application, an image compression system processes an image compression request of a terminal, and performs load balancing automatically according to the load of various image compression servers in the system, thereby implementing processing of mass images of the terminal while achieving the objective of automatic adjustment of load balancing.

The sequence numbers of the foregoing embodiments of the present application are merely for the convenience of description, and do not imply the preference among the embodiments. The technical features in one embodiment may be applied to other embodiments as long as no technical conflict is generated.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present application, but are not intended to limit the present disclosure. Any modification, equivalent replacement, or improvement made within the spirit and principle of the present disclosure shall fall within the protection scope of the present disclosure.

What is claimed is:

1. An image compression method, comprising:
   at an access server having one or more processors and memory for storing program modules to be executed by the one or more processors:
   receiving, by the access server, an image compression request submitted by a terminal, the image compression request comprising multiple to-be-compressed images or uniform resource locator (URL) addresses corresponding to the to-be-compressed images, and image compression time information corresponding to each of the to-be-compressed images;
   selecting, by the access server according to the image compression time information, a size of the to-be-compressed images and a target compression ratio, an image compression server whose load is lower than a preset threshold, and sending the image compression request to the selected image compression server, so that the selected image compression server can compress the images according to the image compression request and save the compressed images;

receiving, by the access server, URL addresses of the compressed images from the selected image compression server; and forwarding, by the access server, the URL addresses of the compressed images to the terminal.

2. The method according to claim 1, wherein the image compression time information is real-time image compression time information, the method further comprising:

selecting, by the access server according to the real-time image compression time information, an image compression server whose current load is lower than the preset threshold; and sending the image compression request to the selected image compression server.

3. The method according to claim 1, wherein the image compression time information is delayed image compression time information, the method further comprising:

dividing, by the access server according to the delayed image compression time information, a period of time from a current time point to the delayed image compression time information into equal image compression intervals;

selecting, in each of the image compression intervals, an image compression server whose load is lower than the preset threshold; and sending the image compression request to the selected image compression server.

4. The method according to claim 1, wherein the step of compressing, by the selected image compression server, the images according to the image compression request and saving the compressed images comprises:

acquiring, by the selected image compression server, the to-be-compressed images according to the URL addresses of the images carried in the image compression request, and compressing the acquired images.

5. The method according to claim 1, further comprising:
after receiving, by the access server, the to-be-compressed images carried in the image compression request submitted by the terminal:
sending, by the access server, the to-be-compressed images to a fault-tolerant backup server for backup.

6. The method according to claim 1, further comprising:
after receiving, by the access server, the URL addresses corresponding to the to-be-compressed images carried in the image compression request submitted by the terminal:
acquiring, by the access server, the to-be-compressed images according to the URL addresses; and
sending the to-be-compressed images to a fault-tolerant backup server for backup.

7. The method according to claim 1, further comprising:
sending, by a compression algorithm control server, a compression algorithm and/or kernel data updating command to the image compression server, so that the image compression server adjusts its own image compression manner according to the updated compression algorithm and/or kernel data.

8. The method according to claim 1, further comprising:
detecting an image download request from the terminal;
extracting at least one of the URL addresses of the compressed images from the image download request;
returning the corresponding compressed images to the terminal; and deleting the corresponding compressed images after receiving from the terminal an acknowledgement of receiving the corresponding compressed images.

9. An image compression system, comprising an access server having one or more processors, one or more memory devices and one or more program instructions stored in the one or more memory devices wherein the one or more program instructions, when executed by the one or more program processors of the access server, cause the access server to:

receive an image compression request submitted by a terminal, the image compression request comprising multiple to-be-compressed images or uniform resource locator (URL) addresses corresponding to the to-be-compressed images, and image compression time information corresponding to each of the to-be-compressed images;

select, according to the image compression time information, a size of the to-be-compressed images and a target compression ratio, an image compression server whose load is lower than a preset threshold, and send the image compression request to the selected image compression server, so that the selected image compression server can compress the images according to the image compression request and save the compressed images; and receive URL addresses of the compressed images, and forward the URL addresses of the compressed images to the terminal.

10. The system according to claim 9, wherein the access server is configured to:

select, according to real-time image compression time information, an image compression server whose load is lower than the preset threshold, and send the image compression request to the selected image compression server; and divide, according to delayed image compression time information, a period of time from a current time point to the delayed image compression time information into equal image compression intervals, select, in each of the image compression intervals, an image compression server whose load is lower than the preset threshold, and send the image compression request to the selected image compression server.

11. The system according to claim 9, wherein the image compression server is further configured to:

compress the images according to the to-be-compressed images carried in the image compression request, save the compressed images, and return the URL addresses of the compressed images to the access server; and acquire the to-be-compressed images according to the URL addresses of the images carried in the image compression request, compress the images, save the compressed images, and return the URL addresses of the compressed images to the access server.

12. The method according to claim 9, wherein the access server is further configured to: further comprises at least one of a first backup module and a second backup module, wherein send the to-be-compressed images carried in the image compression request to a fault-tolerant backup server for backup; and acquire the to-be-compressed images according to the URL addresses, and send the to-be-compressed images to a fault-tolerant backup server for backup.

13. The system according to claim 9, further comprising a compression algorithm control server that is communicatively coupled to the access server and the image compression server, respectively, wherein the compression algorithm control server is configured to send a compression algorithm and/or kernel data updating command to the image compression server, so that the image compression server adjusts its own image compression manner according to the updated compression algorithm and/or kernel data.

* * * * *